(12) United States Patent
Hada

(10) Patent No.: US 7,647,690 B2
(45) Date of Patent: Jan. 19, 2010

(54) MANUFACTURING METHOD OF BEARING MEMBER AND MANUFACTURING METHOD OF SLEEVE UNIT

(75) Inventor: Yasuaki Hada, Kyoto (JP)

(73) Assignee: Nidec Corporation, Kyoto (JP)

( * ) Notice: Subject to any disclaimer, the term of this patent is extended or adjusted under 35 U.S.C. 154(b) by 290 days.

(21) Appl. No.: 11/675,177

(22) Filed: Feb. 15, 2007

(65) Prior Publication Data

US 2007/0188033 A1 Aug. 16, 2007

(30) Foreign Application Priority Data

Feb. 16, 2006 (JP) ............................. 2006-038957

(51) Int. Cl.
*H02K 15/00* (2006.01)
*H02K 7/08* (2006.01)

(52) U.S. Cl. .................... 29/596; 29/732; 29/603.03; 310/90; 360/99.08

(58) Field of Classification Search ........... 29/596–598, 29/732, 736; 310/90, 90.5; 360/98.07, 99.08, 360/99.12; 384/107
See application file for complete search history.

(56) References Cited

U.S. PATENT DOCUMENTS

| 5,914,832 | A | * | 6/1999 | Teshima | ............... | 360/98.07 |
| 6,664,687 | B2 | * | 12/2003 | Ichiyama | ............... | 310/90.5 |
| 6,914,358 | B2 | * | 7/2005 | Tokunaga et al. | ............... | 310/90 |
| 7,202,583 | B2 | * | 4/2007 | Kim | ............... | 310/90 |
| 7,290,934 | B2 | * | 11/2007 | Nishimura et al. | ............... | 384/107 |

FOREIGN PATENT DOCUMENTS

| JP | 2004-019705 A | 1/2004 |
| JP | 2004-328827 A | 11/2004 |

* cited by examiner

*Primary Examiner*—Minh Trinh
(74) *Attorney, Agent, or Firm*—Keating & Bennett, LLP (57) ABSTRACT

A sleeve housing for a motor includes a bearing member, which includes a cylindrical portion and a collar portion and is formed by press working or by forging. The bearing member is retained by a retaining portion which is a portion of a cutting tool and which relatively rotates with respect to the cutting tool in a concentric manner with a predetermined rotation axis in order to execute a cutting process on a lower portion of the collar portion with reference to an upper portion thereof, so as to effectively form the sleeve housing with very high precision.

20 Claims, 11 Drawing Sheets

MANUFACTURING METHOD OF BEARING MEMBER AND MANUFACTURING METHOD OF SLEEVE UNIT

BACKGROUND OF THE INVENTION

1. Field of the Invention

The present invention relates to a manufacturing method of a bearing member used in a fluid dynamic bearing of a motor, and to a manufacturing method of a sleeve unit.

2. Description of the Related Art

Conventionally, a recording disk drive device such as a hard disk drive includes a spindle motor (hereinafter, referred to as a "motor") for driving a recording disk. In recent years, there has been great demand for a motor including a bearing mechanism which utilizes a dynamic pressure. Such a bearing mechanism has a configuration in which a thrust bearing portion or a radial bearing portion utilizing a dynamic pressure of lubricating oil which is provided in a space between a shaft (and a portion connected thereto) and a sleeve or the like.

For example, a technology related to a thrust bearing portion having a configuration in which an annular shaped flange portion is provided at a top side of a sleeve housing surrounding the sleeve, and a top surface of the flange portion having formed thereon a plurality of dynamic pressure grooves and a bottom side of a rotor hub are opposed to one another has been disclosed. Also, a technology in which a bottom surface of the flange portion and a discoid member which is attached to the rotor hub are opposed to one another, whereby preventing the rotor hub from being pressured upward in an excessive manner while the motor is in motion, has been disclosed.

Also, a technology in which the annular shaped flange portion which is arranged between, in an axial direction, the bottom surface of the rotor hub and the top surface of the discoid member is provided at the top of the sleeve or the sleeve housing, wherein the sleeve housing is formed by press working, has been disclosed.

While the motor as described above is in motion, due to a floatation of the rotor hub, a minute gap will be generated between the top surface of the flange portion and the bottom surface of the rotor hub, and between the bottom surface of the flange portion and the top surface of the discoid member. Because the gaps are influential factors on the characteristics of the motor, the gaps are precisely designed, and therefore, a dimensional tolerance of an axial thickness of the flange portion used therein is extremely small.

Also, when the sleeve housing including the flange portion as described above is formed by press working, due to an abrasion of a die used therein, it becomes difficult to maintain a predetermined thickness for the flange portion in a continuous manner. Also, burrs formed at an edge of the flange portion during press working may have a negative impact on the characteristics of the motor. Also, there is a possibility that particles of metal powder of the flange portion after press working or those of a die assembly used during the process may be attached to the bottom surface of the flange portion, thereby contaminating the lubricating oil.

SUMMARY OF THE INVENTION

In order to overcome the problems described above, preferred embodiments of the present invention provide a bearing member which is used in a fluid dynamic bearing and which is arranged between a discoid member to which a shaft of a rotor of the motor is secured and an annular portion which opposes the bottom surface of the discoid member and is secured thereto.

The bearing member preferably includes a cylindrical or substantially cylindrical portion and a collar portion extending outwardly from the cylindrical or substantially cylindrical portion is formed preferably by press working or by forging.

The bearing member will be retained by a retaining portion which rotates, in a concentric manner with a predetermined rotation axis, relatively with respect to a tool in order to execute a cutting process to cut a lower portion of the collar potion with reference to an upper portion thereof.

According to a preferred embodiment of the present invention, a sleeve member having a precise dimension will be formed effectively.

According to various preferred embodiments of the present invention, the bearing member and a sleeve unit having a superior reliability and durability will be achieved.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to FIGS. 1 thorough 9.

Note that in the description of the preferred embodiments of the present invention herein, words such as upper, lower, left, right, upward, downward, top, and bottom for explaining positional relationships between respective members and directions merely indicate positional relationships and directions in the drawings. Such words do not indicate positional relationships and directions of the members mounted in an actual device.

Also note that reference numerals, figure numbers and supplementary explanations are shown below for assisting the reader in finding corresponding components in the description of preferred embodiments below to facilitate the understanding of the present invention. It is understood that these expressions in no way restrict the scope of the present invention.

First Preferred Embodiment

Figure 1:
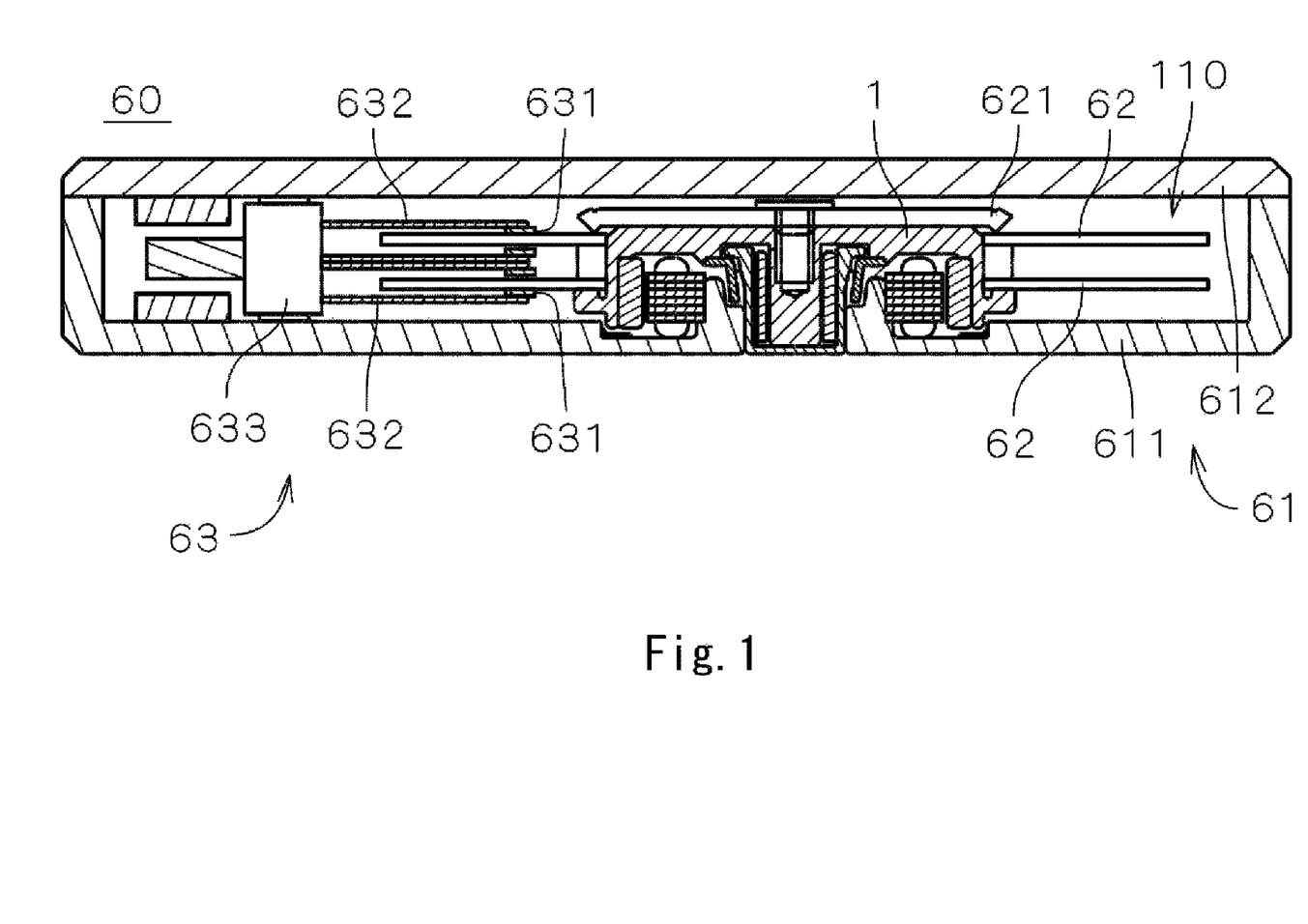
FIG. 1 is a diagram showing an internal configuration of a recording disk drive device according to a first preferred embodiment of the present invention.

FIG. 1 is a diagram showing an internal configuration of a recording disk drive device 60 including therein an electrical spindle motor 1 (hereinafter, referred to as "motor 1") according to a first preferred embodiment of the present invention.

The recording disk drive device 60 is a hard disk drive device which preferably includes two discoid shaped recording disks 62 used for recording data, an access section 63 used for storing data in the recording disk 62 and/or reading data in the recording disk 62, an electrical motor 1 for retaining and rotating the recording disk 62, and a housing 61 for accommodating in an inner space 110 therein the recording disk 62, the access section 63 and motor 1.

As shown in FIG. 1, the housing 61 includes a substantially cup-shaped first housing member 611 and a plate shaped second housing member 612. The first housing member 611 includes at a top portion thereof an opening. The first housing member 611 contains and holds the motor 1 and the access section 63 at an inner bottom surface thereof. The second housing member 612 covers the opening of the first housing member 611.

In the recording disk drive device 60, the housing 61 is configured by attaching the second housing member 612 to the first housing member 611, wherein the inner space 110 within the housing 61 is a clean sealed space allowing therein only an extremely small amount of foreign substances.

The two recording disks 62 are affixed, via a damper 621, to a top portion of the motor 1. The access section 63 includes a magnetic head 631, an arm 632 for supporting the magnetic head 631, and a head shifting mechanism 633. The access section 63 is arranged near the recording disk 62 and performs the reading and writing of data. The head shifting mechanism 633, by moving the arm 632, moves the head 631 closer to the recording disk 62 and to the motor 1. By virtue of such a configuration, the head 631 has an access to a predetermined position of the recording disk 62 so as to perform the reading and writing of data.

Figure 2:
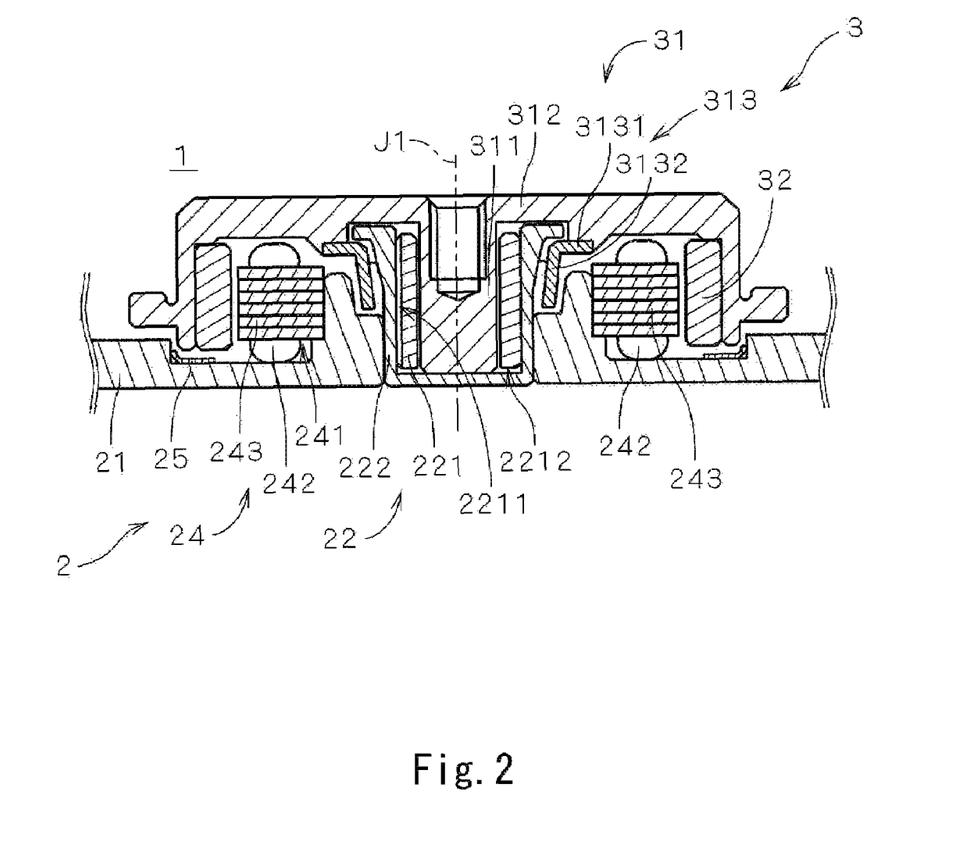
FIG. 2 is a diagram showing a cross sectional view of a motor.

FIG. 2 is a diagram showing a cross sectional view of the motor 1 used to rotate the recording disk 62 (See FIG. 1). As shown in FIG. 2, the motor 1 is an outer rotor type motor including therein a stator portion 2 and a rotor 3. The rotor 3 is rotatably supported by a dynamic bearing utilizing lubricating oil. The rotor 3 is concentric with a central axis J1 (which is also a central axis of a sleeve housing 222, which will be described below) of the motor 1. For clarity of description, a side in the axial direction of the central axis J1 near the rotor 3 will be referred to as an upper side or a top side, whereas a side of the central axis J1 near the stator portion 2 will be referred to as a lower side or a bottom side, which is not necessarily consistent with an actual gravitational direction.

The rotor 3 includes a substantially cup shaped rotor hub 31, and a rotor magnet 32 which is attached to the rotor hub 31 and which is arranged surrounding the central axis J1. The rotor hub 31 which is preferably made of a stainless material or other suitable material includes a disk portion 312, a shaft 311, and an annular shaped member 313.

The disk portion 312 is a substantially discoid shaped member extending in a radial direction with respect to the central axis J1. The shaft 311 is a substantially cylindrically shaped member concentric with the central axis J1. The shaft 311 is secured to the disk portion 312 and protrudes downwardly (that is, toward a direction of the stator portion 2) from the disk portion 312.

The annular shaped member 313 which is arranged at a lower side of the disk portion 312 includes an annular portion 3131 and a cylinder portion 3132. The annular portion 3131 is secured to the disk portion 312, and the cylinder portion 3132 protrudes downwardly from an inner circumferential side of the annular portion 3131. The rotor magnet 32 is an annular shaped multiple poled magnet arranged at an outer circumferential portion of the rotor hub 31.

The stator portion 2 includes a base plate 21, a sleeve unit 22 (which will be described below), a stator 24, and a thrust yoke 25. The stator 24 which is attached to the base plate 21 includes a substantially annular shaped thrust yoke 25 arranged below the rotor magnet 32.

The base plate 21 which is a portion of the first housing member 611 (see FIG. 1) and formed integrally with the first housing member 611 is preferably formed by press working on a plate preferably made of aluminum, aluminum alloy, or either magnetic or nonmagnetic iron metal.

The thrust yoke 25 which is a component preferably formed of a magnetic material is concentric with the central axis J1 and is secured to the base plate 21. The thrust yoke 25 attracts the rotor 3 toward the base plate 21 by utilizing a magnetic force generated between the rotor magnet 32 and the thrust yoke 25. The stator 24 generates a torque centering the central axis J1 between the rotor magnet 32 and the stator 24.

The stator 24 which is attached to the base plate 21 preferably by press fitting or by using an adhesive includes a core 241 which is formed by laminating a plurality (for example, 6 in the present preferred embodiment) of thin core plates made of silicon steel. The core 241 includes an annular shaped core back for connecting a plurality of tooth portions 243 each extending in the radial direction and centered about the central axis J1, wherein the core back connects the plurality of tooth portions at an innermost portion thereof. In each core plate, the portions corresponding to a tooth portion 243 and the core back are formed integrally, therefore, the plurality of tooth portions 243 and the core back are magnetically connected to one another. The stator 24 includes a plurality of coils 242. The plurality of coils 242 each are formed by winding a conductive wire around each tooth portion 243.

The sleeve unit 22 includes a substantially cylindrical sleeve 221 into which the shaft 311 is inserted, and a substantially cylindrical sleeve housing 222 which defines a bearing member and which is attached to an outer circumference of the sleeve 221. The sleeve unit 22 is arranged at a substantially center portion of the base plate 21. The sleeve 221 is secured preferably via an adhesive to an inner circumferential surface of the sleeve housing 222. Note that the sleeve housing 222 may be a cylindrically or substantially cylindrically shaped member having no bottom portion. When the sleeve housing 222 is provided without the bottom portion, a discoid shaped bottom portion member will be attached to a bottom end of the sleeve housing 222.

The sleeve 221 preferably is a porous member, formed by pressure molding, putting a powered starting material into a mold, press hardening the material, sintering the hardened material, and then press hardening again in the mold so as to compress it into a final form. Various kinds of metal powders, powders of metallic compounds, powders of non metallic compounds, etc., (e.g., a blend of iron (Fe) and copper (Cu) powders; a blend of copper and tin (Sn) powders; a blend of copper, tin and lead (Pb) powders; or a blend of iron and carbon (C) powders) may be used as the starting material for forming the sleeve 221. On an outer surface of the sleeve 221, a plurality of grooves 2211 each extending upwardly and downwardly, which are formed during the process mentioned above (e.g., during a pressure molding step prior to a compressing step).

Figure 3:
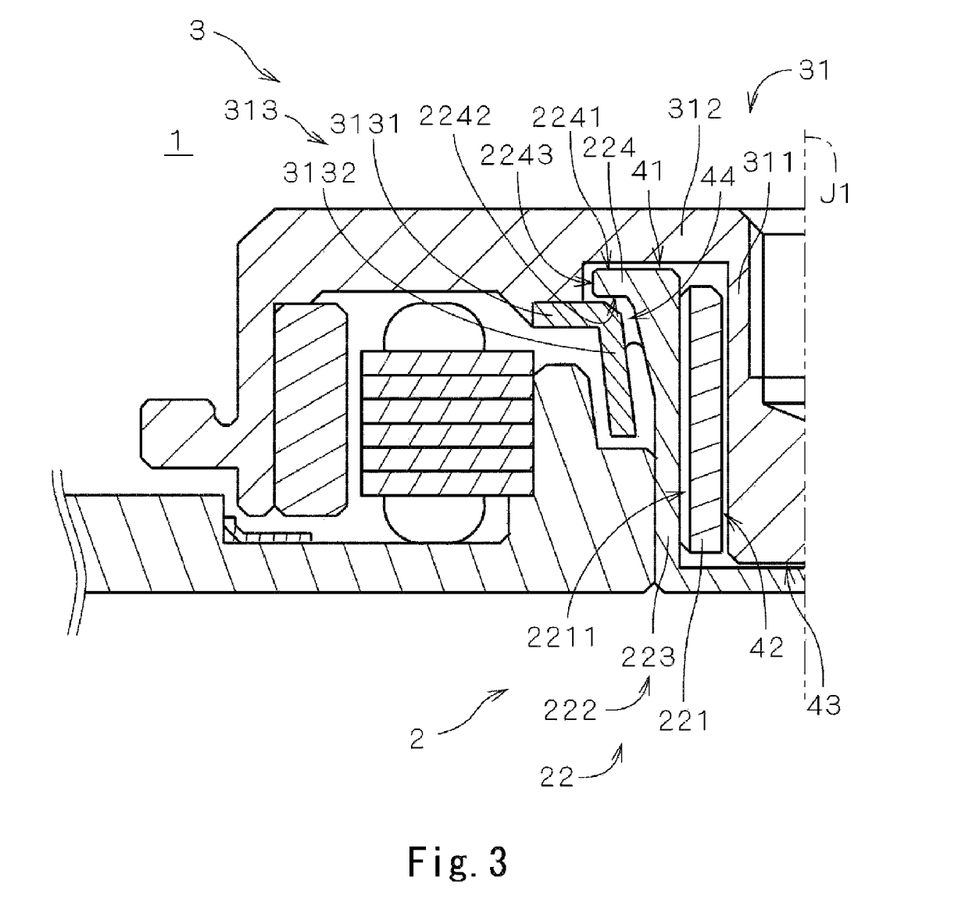
FIG. 3 is a diagram showing an enlarged view of a portion of the motor.

FIG. 3 is a cross sectional diagram showing an enlarged view of a portion of the motor 1 (a left hand portion of the motor shown in FIG. 2). As shown in FIG. 3, the sleeve housing 222 includes a substantially cylindrically shaped housing cylindrical portion 223, and a substantially annular shaped collar portion 224. The sleeve 221 is attached at an inner circumference of the housing cylindrical portion 223.

The collar portion 224 which extends radially in an outward direction is arranged at a top end of the housing cylindrical portion 223. The housing cylindrical portion 223 and the collar portion 224 which are formed integrally with one another by press working are made of a metal material (e.g., a copper alloy material such as phosphor bronze). An internal diameter of the housing cylindrical portion 223 in a circumferential direction is uniform, whereas as an outer diameter thereof gradually increases toward the collar portion 224.

In the motor 1, the collar portion 224 of the sleeve housing 222 is arranged in a space between the disk portion 312 and the annular portion 3131. By virtue of such configuration, the rotor 3 will be prevented from being removed from the top end of the stator portion 2. In other words, the annular portion 3131 of the rotor hub 31 and the collar portion 224 of the sleeve housing 222 together define a retaining mechanism for the rotor 3.

Hereinafter, the fluid dynamic bearing which rotatably supports the rotor 3 with respect to the stator portion 2 will be described. As shown in FIG. 3, in the motor 1, a minute space is provided between a bottom surface of the disk portion 312 and a top surface 2241 of the collar portion 224; an inner surface of the sleeve 221 and the outer surface of the shaft 311; a bottom end surface of the shaft 311 and a top surface of a bottom of the housing cylindrical portion 223 of the sleeve housing 222; and an outer surface of the housing cylindrical portion 223 and an inner surface of the cylinder portion 3132. Hereinafter, each respective space will be referred to as an upper portion gap 41, side portion gap 42, a lower portion gap 43, and an outer portion gap 44.

In the sleeve unit 22, due to the plurality of grooves 2211 formed at the outer surface of the sleeve 221 and the inner surface of the sleeve housing 222, a plurality of flow passes connecting the upper portion and the lower portion of the sleeve 221 are provided. That is, a plurality of flow passes connecting the upper portion gap 41 and the lower portion gap 43 are provided. Also, at the bottom end of the sleeve 221, a horizontal groove 2212 (see FIG. 2) connecting the plurality of grooves 2211 and the lower portion gap 43 are provided. In the motor 1, the lubricating oil is provided in each of the flow passes and in each of the gaps.

As described above, the outer surface of the upper portion of the housing cylindrical portion 223 includes an inclined surface, wherein the outer diameter gradually decreases toward the lower portion thereof. Also, the inner surface of the cylinder portion 3132 has an inclined surface corresponding to the inclined surface of the housing cylindrical portion 223 wherein the inner diameter of the cylinder portion 3132 gradually decreases toward the lower portion thereof.

Note that an inclination of the inner surface of the cylinder portion 3132 with respect to the central axis J1 is preferably smaller than that of the inclined surface of the housing cylindrical portion 223. Therefore, a width of the outer portion gap 44, namely a distance between the outer surface of the housing cylindrical portion 223 and the inner surface of the cylinder portion 3132 gradually increases in the downward direction. By virtue of the configuration, an interface of the lubricating oil at the outer portion gap 44 will be formed in a meniscus manner due to a capillary phenomenon. Therefore, the outer portion gap 44 includes a tapered seal structure and acts as an oil buffer preventing the lubricating oil from leaking.

In the sleeve housing 222, a plurality of grooves for generating a pressure which is applied to the lubricating oil toward the central axis J1 when the rotor 3 is in motion are formed at the top surface 2241 of collar portion 224 so as to provide a thrust dynamic pressure bearing mechanism at the upper portion gap 41. That is, the aforementioned grooves include a plurality of dynamic pressure grooves for generating fluid dynamic pressure while the motor 1 is in motion. The grooves may have a spiral shape or other suitable shape.

Also, a plurality of grooves for generating the fluid dynamic pressure within the lubricating oil are formed at each of the opposing surfaces defining the side portion gap 42, thereby configuring a radial dynamic pressure bearing member. The aforementioned grooves in the side portion gap 42 may have a herringbone shape.

As described above, in the motor 1, the lubricating fluid, which acts as a working fluid, is provided in the upper portion gap 41, the side portion gap 42, the lower portion gap 43, the outer portion gap 44, and the plurality of flow passes formed between the grooves 2211 of the sleeve 221 and the inner surface of the sleeve housing 222. While the rotor 3 is in motion, the rotor 3 is supported via the dynamic pressure of the lubricating oil. Further, when the rotor 3 rotates about the central axis J1 with respect to the stator portion 2, the recording disk 62 (See FIG. 1) which will be attached to the rotor 3.

According to the motor 1, the rotor 3 is supported in a non-contact manner through the lubricating oil in the fluid dynamic bearing, thereby achieving a quieter and precise rotation of the rotor 3. Further, since the sleeve 221 is, as described above, preferably made of the porous material, the lubricating oil will be appropriately retained within the fluid dynamic bearing, and an impurity such as particles of the lubricating oil will be absorbed, thereby maintaining the lubricating oil cleanly.

According to the fluid dynamic bearing of the motor 1, the lubricating oil which is forced out of the upper portion gap 41 toward the central axis J1 will return to the upper portion gap 41 through the side portion gap 42, the lower portion gap 43, the horizontal groove 2212, and then the plurality of grooves 2211. By virtue of this configuration, an even pressure is applied to the lubricating oil in the fluid dynamic bearing, thereby preventing an excessive pressure from being applied to the lower portion gap 43. That is, the even pressure prevents the rotor 3 from being pressured upward in an excessive manner. Also, the even pressure prevents a formation of air bubbles within the lubricating oil, and an oil leakage.

Note that even when a strong force is applied to the motor 1 and then the rotor 3 is pressured upward because of the force, a bottom surface 2242 of the collar portion 224 of the sleeve housing 222 prevents the annular portion 3131 from moving in the upward direction, therefore the rotor 3 is prevented from moving in the upward direction.

Also note that a total amount of distance between a bottom facing surface of the disk portion 312 and the top surface 2241 of the collar portion 224, and the bottom surface 2242 and the top surface of the annular portion 3131, in the axial direction while the rotor 3 is in motion, is preferably approximately 30 μm, for example. Note that a dimensional tolerance in the axial direction for the disk portion 312, the annular portion 3131 and the collar portion 224 each is about ±5 μm. Also, a distance in the radial direction between an outer side surface 2243 of the collar portion 224 and the rotor hub 31 is preferably approximately 50 μm, for example.

Figure 4:
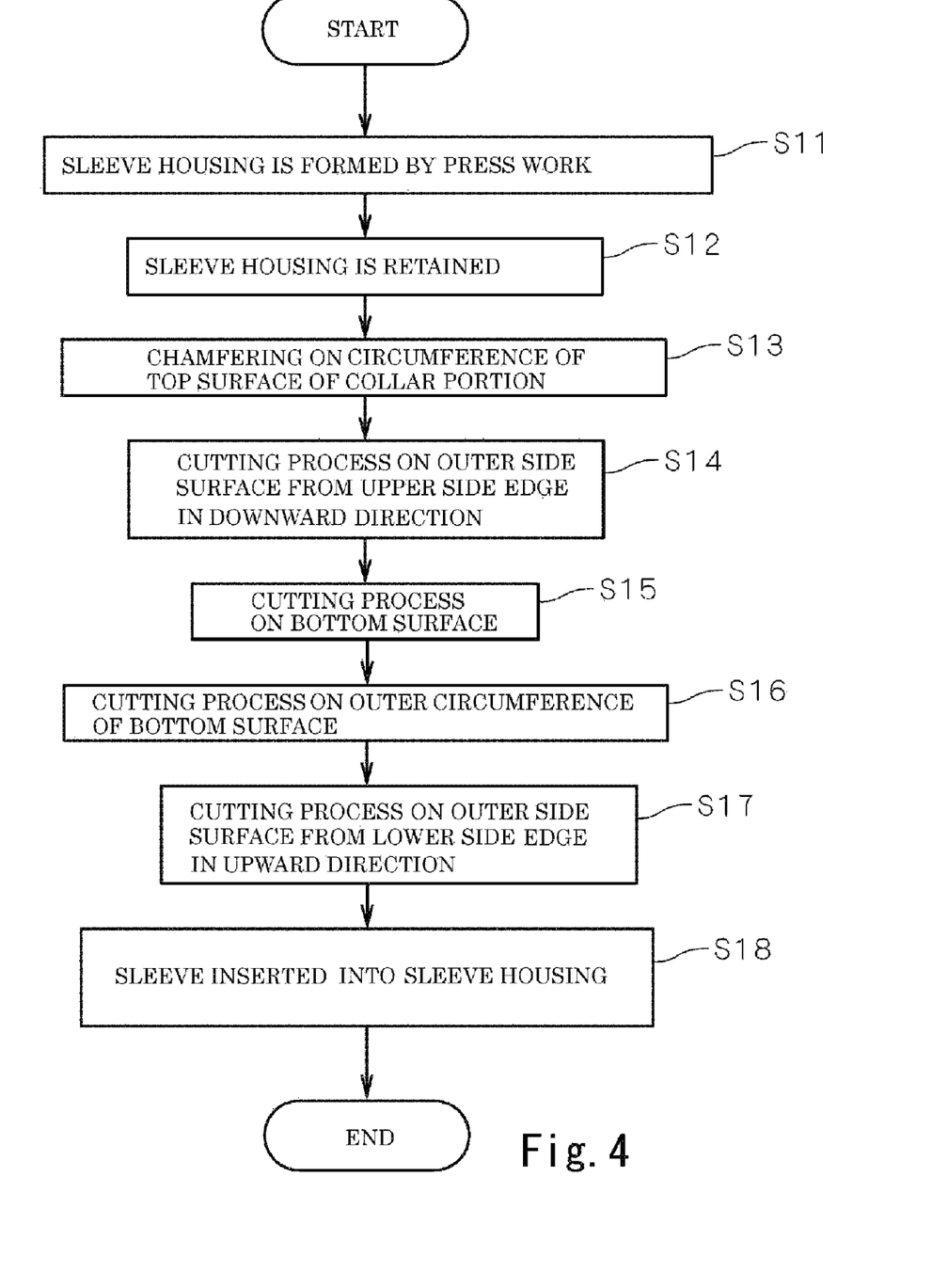
FIG. 4 is a flowchart showing a flow of steps required to manufacture a sleeve housing and a sleeve unit.
Figure 5A:
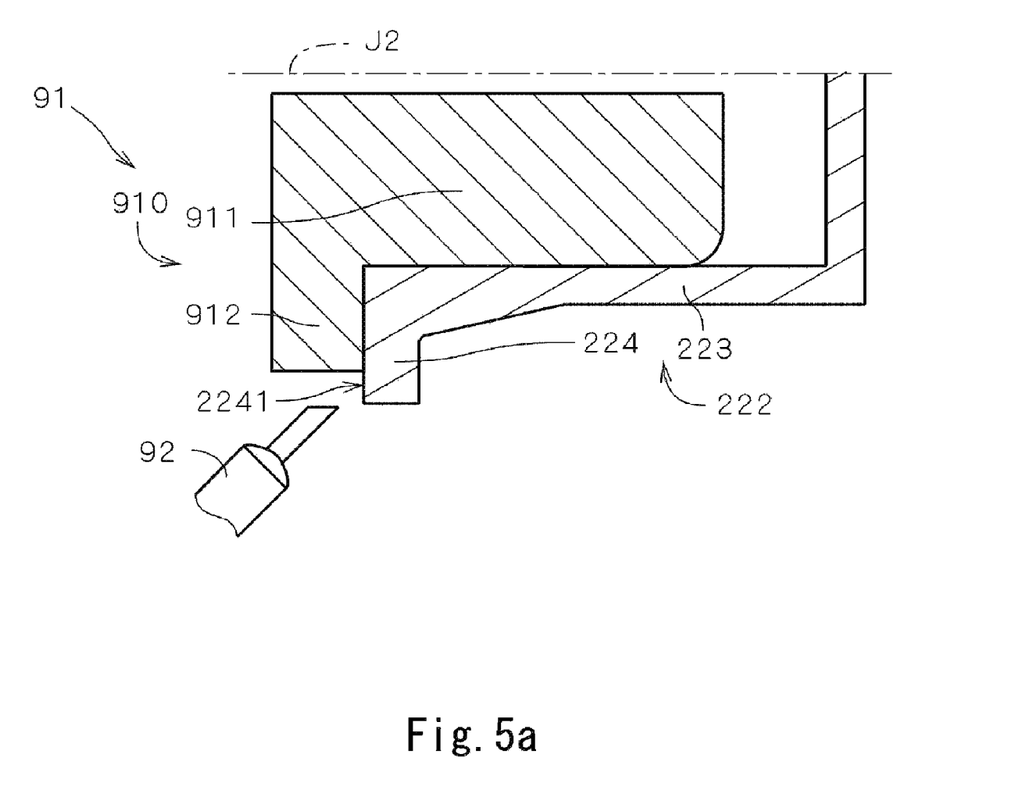
FIG. 5a is a diagram showing a portion of a cross sectional view of the sleeve housing during the manufacturing process of the sleeve housing.

Next, a manufacturing method of the sleeve housing 222 and a manufacturing method of the sleeve unit 22 will be described. FIG. 4 is a flowchart showing a flow of steps of the manufacturing method of the sleeve housing 222 and the manufacturing method of the sleeve unit 22. FIGS. 5A and 5C each is a diagram showing a portion (e.g., the left hand portion as in FIG. 3) of a cross sectional view of the sleeve housing 222 during the manufacturing process of the sleeve housing 222.

First, a preliminary shape of the sleeve housing 222, as shown in FIG. 5a, including the housing cylindrical portion 223 and the collar portion 224 is formed by press working of a work piece (e.g., a metal plate) (step S1). The sleeve housing 222 after the aforementioned press working includes the collar portion 224 having a thickness in the axial direction (e.g., a thickness in the horizontal direction according to FIG. 5*a*) that is about 10 μm to about 40 μm thicker than the collar portion 224 after a final step of the process of the manufacturing method, and the collar portion 224 having an outer diameter that is larger than the collar portion 224 after the final step of the process of the manufacturing method. The dynamic pressure grooves provided at the top surface 2241 of the collar portion 224 is also formed during S11. According to the present preferred embodiment, when the sleeve housing 222 is pressed out of the work piece, a burr will be formed surrounding a circumference of the top surface 2241 due to a force applied thereto in a downward direction from the side of the collar portion 224.

Figure 5B:
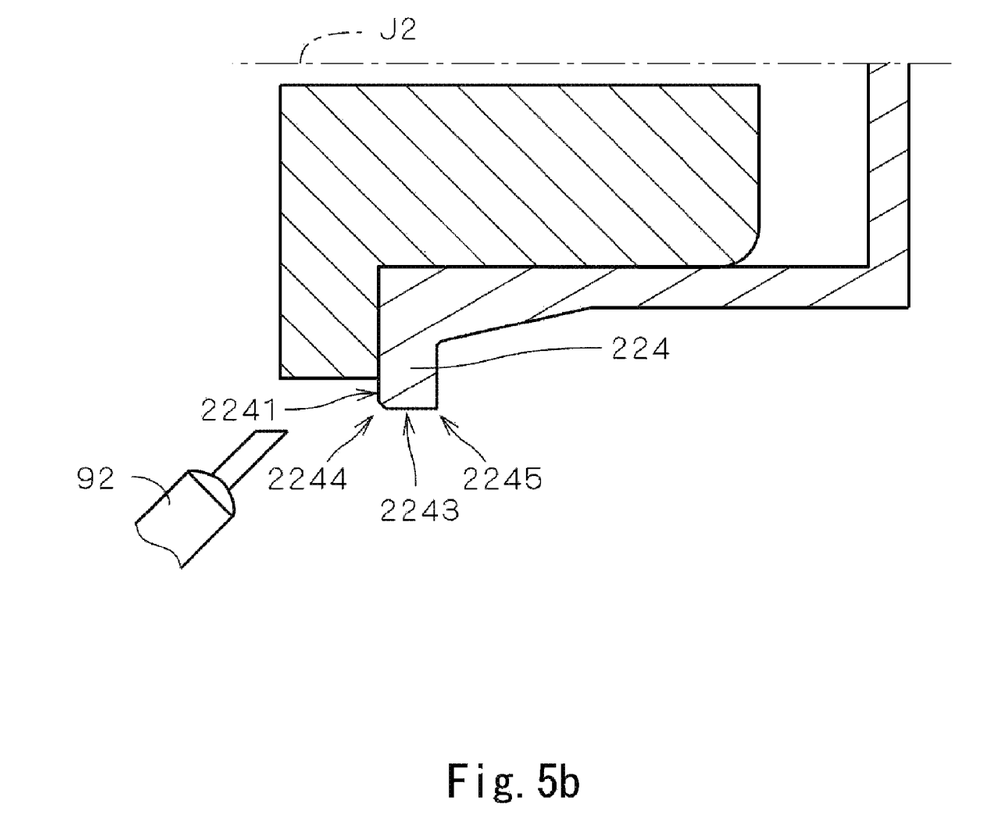
FIG. 5b is a diagram showing a portion of a cross sectional view of the sleeve housing during the manufacturing process of the sleeve housing.
Figure 5C:
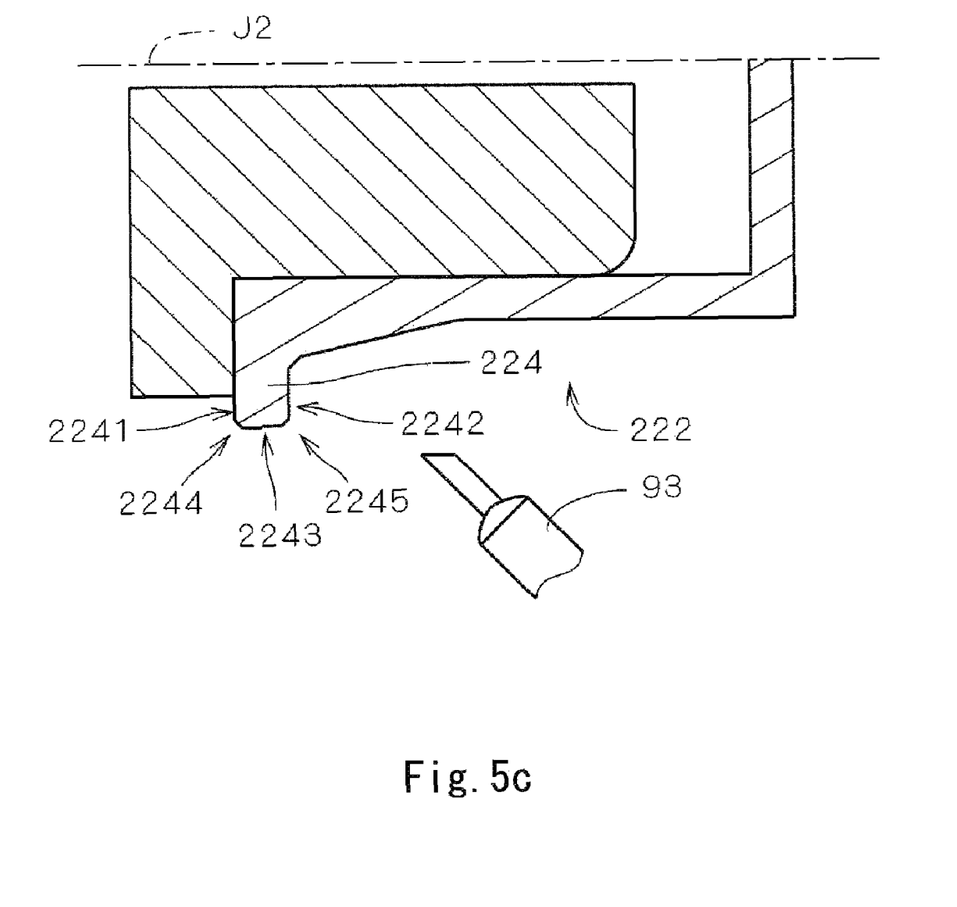
FIG. 5c is a diagram showing a portion of a cross sectional view of the sleeve housing during the manufacturing process of the sleeve housing.

Next, the sleeve housing 222 after the aforementioned press working has been performed is retained as shown in FIG. 5*b* by a diaphragm chuck (hereinafter, simply referred to as a "chuck") 91 which is a retaining portion of a CNC (Computer Numerically Controlled) lathe (step S12). At this point, the sleeve housing 222 is retained such that the central axis J1 (see FIG. 2) is concentric with a rotational axis J2 of the chuck 91. The chuck 91 is preferably made of a material which is relatively soft, has a high abrasion quality, and creates a very small amount of metal powder which can be generated by friction. Also, the chuck 91 preferably has an annular shape that is centered about the rotational axis J2.

The chuck 91 includes a plurality of chuck members 910 which are inserted into the housing cylindrical portion 223 from a side of the collar portion 224, and move in a direction away from the rotational axis J2 so as to be in contact with the inner surface of the housing cylindrical portion 223. Each chuck member 910 includes an insertion portion 911 which will be inserted into the housing cylindrical portion 223, and a latch portion 912 which extends in an outward direction at one end of the insertion portion 911.

The insertion portion 911 of each chuck member 910 is inserted from a left hand side according to FIG. 5*a* into the housing cylindrical portion 223. The latch portion 912 of each chuck member 910 is in contact with the top surface 2241 of the collar portion 224. Then, the plurality of chuck members 910 each extend in the radial direction centering around the rotational axis J2 (that is, the direction away from the rotational axis J2) so as to make contact with the inner surface of the housing cylindrical portion 223, and so as to apply pressure on the inner surface in an outward direction. As a result of this arrangement, the sleeve housing 222 will be retained by the chuck 91. While the sleeve housing 222 remains retained by the chuck 91, the chuck 91 rotates about the rotational axis J2 with respect to a cutting tool, and therefore, the sleeve housing 222 rotates with respect to the cutting tool.

While the sleeve housing 222 is retained by the chuck 91, the collar portion 224, which rotates along with the chuck 91, goes through a cutting process executed by a cutting tool 92. To be more specific, as shown in FIG. 5*b*, a circumferential portion of the top surface 2241 is chamfered (step S13). Then, the cutting tool 92 moves from an upper side edge 2244 of the outer side surface 2243 in the downward direction (e.g., a direction from a circumferential edge of the top surface 2241 of the collar portion 224 to the right thereof according to FIG. 5*b*) in order to execute the cutting process on the outer side surface 2243 (step S14). At this point, the cutting process executed on the outer side surface 2243 is to be executed on an entire surface thereof (e.g., an entire area from the upper side edge 2244 to a lower side edge 2245).

Next, as shown in FIG. 5*c*, a cutting process on the bottom surface 2242 from the inner side thereof toward the outer side thereof is executed by a cutting tool 93 (which is different from the aforementioned cutting tool 92 used in steps S13 and S14). The aforementioned cutting process cuts the collar portion 224 such that the collar portion 224 will have a predetermined thickness to meet the designed thickness with the top surface 2241 as a positional reference (step S15). In other words, the aforementioned thickness will be within the dimensional tolerance. According to the present preferred embodiment, preferably about 10 μm to about 40 μm in depth of the bottom surface 2242 will be subject to the cutting process, for example. Note that the cutting tool 92 which is used for chamfering the top surface 2241 may be used on the bottom surface 2242.

Then, a chamfering process will be executed on an outer circumference of the bottom surface 2242 (step S16). Then, the cutting tool 93 moves in the upward direction (e.g., a direction from an outer circumference of the bottom surface 2242 of the collar portion 224 to the left thereof according to FIG. 5*c*) from the lower side edge 2245 of the outer side surface 2243 so as to execute a second cutting process on the outer side surface 2243 (step S17). By virtue of this process, the outer diameter of the collar portion 224 will reliably meet its design requirement. The second cutting process executed on the outer side surface 2243 will end when the cutting tool 93 stops making contact with a center area in the axial direction of the outer side surface 2243.

After the manufacturing of the sleeve housing 222 ends, the sleeve 221 will be inserted into the inner side of the sleeve housing 222, wherein the adhesive is provided in the space the sleeve 221 is inserted, and a minute gap is provided between the sleeve housing 222 and the sleeve 221 (step S18).

As described above, since press working is executed on the work piece in order to manufacture the sleeve housing 222, a preliminary shape of the sleeve housing 222 will be formed effectively. Further, since the bottom surface 2242 of the collar portion 224, which initially is formed to have a thickness larger than the design requirement, goes through the cutting process in order to meet the design requirement, the accuracy of meeting the design requirement is improved (e.g., the dimensional tolerance of the present preferred embodiment is about ±5 μm).

When the plurality of dynamic pressure grooves are formed at the top surface 2241 of the collar portion 224 as is the case in the motor 1, a precise thickness dimension of the collar portion 224 will be required in order to improve the characteristics of such motor. The manufacturing method described above, by which the precise thickness dimension of the collar portion 224 can be improved, is well suited for manufacturing the sleeve housing 222 which includes a plurality of dynamic pressure grooves at the top surface 2241 of the collar portion 224.

Further, since the bottom surface 2242 of the collar portion 224 goes through the cutting process, particles of metal powder which may be attached to the bottom surface 2242 during the press working will be removed. Also, since the particles of metal powder will be removed, a contamination of the lubricating oil which may be caused by the presence of the metal powder therein can be prevented.

Further, since a surface roughness of the bottom surface 2242 of the collar portion 224 is improved, the abrasion quality thereof will also be improved. By virtue of such configuration, even when the rotor hub 31 is, while the motor 1 is in motion, forced excessively in the upward direction due to a force applied thereto in which the bottom surface 2242 of the collar portion 224 and the annular portion 3131 of the rotor hub 31 make contact with each other, generation of metal powder due to friction of the bottom surface 2242 will be suppressed, and thereby effectively controlling the contamination of the lubricating oil.

Further, when the bottom surface 2242 of the collar portion 224 goes through the cutting process, more than about 10 μm in depth of the surface thereof will be removed, and therefore, the particles of metal powder attached on the bottom surface 2242 will be removed.

As for the manufacturing of the sleeve housing 222, since the top surface 2241 of the collar portion 224 goes through the chamfering process, the burr formed on the circumference of the top surface 2241 will be removed thereby achieving the precise thickness dimension of the collar portion 224. Note that since the chamfering process removes the burr formed on the top surface 2241, a separate process for removing the burr will not be necessary.

Furthermore, since the cutting process removes the predetermined portion in depth of the outer side surface 2243, the precise dimension of the external diameter of the collar portion 224 is achieved. Also, since the second cutting process ends when the cutting tool reaches the portion of the outer side surface 2243 between the upper side edge 2244 and the lower side edge 2245, no burr will be formed near the top surface 2241 or near the bottom surface 2242 after the cutting process. By virtue of the manufacturing method according to the present preferred embodiment, the precision for the axial thickness of the collar portion 224 is achieved.

According to the present preferred embodiment, each insertion portion 911 of the plurality of chuck members 910 makes contact with the inner surface of the housing cylindrical portion 223, and the latch portion 912 makes contact with the collar portion 224 of the sleeve housing 222. By virtue of such manufacturing method, the sleeve housing 222 will be positioned appropriately with respect to the rotational axis J2 even while the bottom surface 2242 of the collar portion 224 goes through the cutting process. As a result, the cutting process will be executed on the collar portion 224 with high precision.

Second Preferred Embodiment

Figure 6:
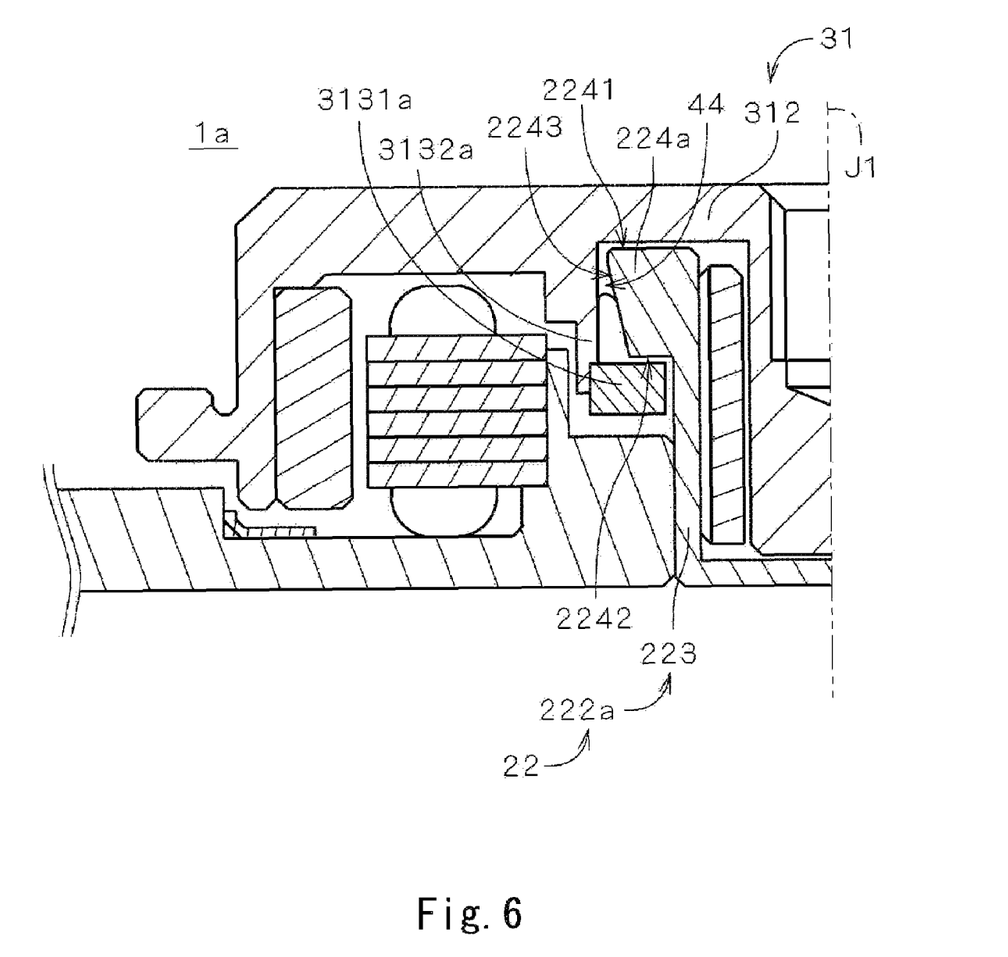
FIG. 6 is a diagram showing an enlarged view of a portion of a motor according to a second preferred embodiment of the present invention.

Hereinafter, a second preferred embodiment of the motor 1 (hereinafter referred to as a motor 1a) of the present invention will be described. FIG. 6 is a cross sectional diagram showing an enlarged view of a portion of the motor 1a according to the second preferred embodiment of the present invention. The motor 1a preferably includes a sleeve unit 222a having a shape that is different from the sleeve housing 222 as shown in FIGS. 2 and 3.

In the rotor hub 31, instead of the annular shaped member 313, a substantially cylindrically shaped cylinder portion 3132a and an annular portion 3131a are preferably provided. The cylinder portion 3132 at a portion thereof surrounding the sleeve housing 222a protrudes in the downward direction. The annular portion 3131a at a bottom end of the cylinder portion 3132a protrudes toward the central axis J1. Other than the aforementioned differences, the rotor hub 31 according to the present preferred embodiment preferably has an identical configuration as that shown in FIGS. 2 and 3. In FIG. 6, elements similar to those shown in FIGS. 2 and 3 are denoted by similar reference numerals. Also, a flow of the manufacturing method of the sleeve housing 222a and that of the sleeve unit 22 are preferably the same as those according to the first preferred embodiment.

As shown in FIG. 6, the sleeve housing 222a includes the substantially cylindrically shaped housing cylindrical portion 223 and a flange shaped collar portion 224a which protrudes outwardly at a top end of the housing cylindrical portion 223. The outer side surface 2243 of the collar portion 224a is such that the top portion thereof has the cylindrical shape having a predeterminedly fixed external diameter, and a portion therebelow is inclined such that the external diameter decreases toward the bottom end thereof. Since the inner diameter of the cylinder portion 3132a is fixed, the outer portion gap 44 between the outer side surface 2243 of the collar portion 224a and the inner side surface of the cylinder portion 3132a increases toward the bottom end thereof. In the motor 1, the interface of the lubricating oil will be formed in the outer portion gap 44 in a manner similar to the first preferred embodiment. That is, the bottom surface 2242 of the collar portion 224a makes no contact with the lubricating oil.

A total of distances between the top surface 2241 of the collar portion 224 and the bottom surface of the disk portion 312; and between the bottom surface 2242 of the collar portion 224a and the annular portion 3131a of the rotor hub 31 preferably is, as in the first preferred embodiment, approximately 30 μm, for example. Also, a dimensional tolerance of a thickness of the collar portion 224a (that is, a distance between, with respect to the central axis J1, the top surface 2241 and the bottom surface 2242) is ±5 μm.

The collar portion 224a of the sleeve housing 222a is manufactured in accordance with steps S11 through S17 in FIG. 4. That is, the chamfering process on the circumferential edge of the top surface 2241, the first cutting process on the outer side surface 2243, the cutting process on the bottom surface 2242, the chamfering process on the circumferential edge of the bottom surface 2242, and then the second cutting process on the outer side surface 2243 will be executed. By virtue of such a manufacturing method in which press working is executed on the work piece, the preliminary shape of the sleeve housing 222a will be formed effectively.

Third Preferred Embodiment

Figure 7:
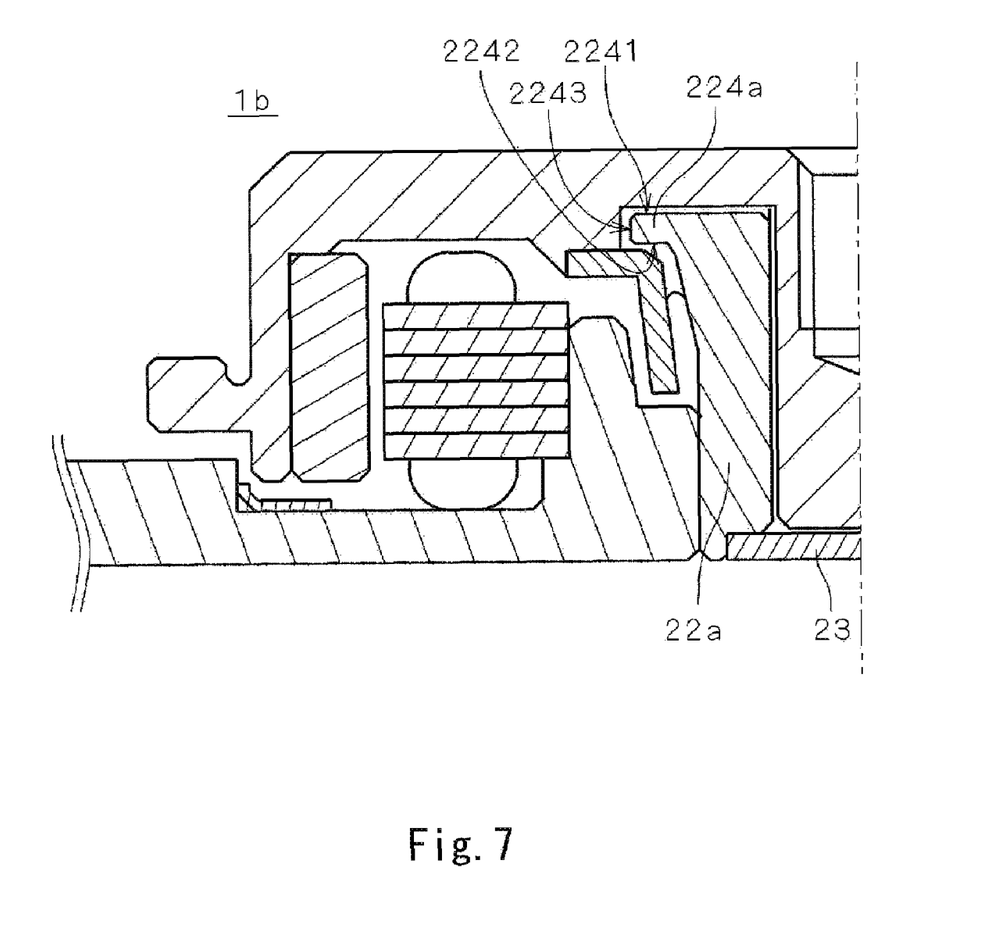
FIG. 7 is a diagram showing an enlarged view of a portion of a motor according to a third preferred embodiment of the present invention.

Hereinafter, a third preferred embodiment of the motor 1 (hereinafter referred to as a motor 1b) of the present invention will be described. FIG. 7 is a cross sectional diagram showing an enlarged view of a portion of the motor 1b according to the third preferred embodiment. The motor 1b includes, instead of the sleeve unit 22 as shown in FIGS. 2 and 3, a substantially cylindrically shaped sleeve 22a which defines a bearing member and is a seamless component made of a metal material, and a substantially discoid shaped bottom portion member 23 which closes an opening at a bottom of the sleeve 22a. In FIG. 7, elements similar to those shown in FIGS. 2 and 3 are denoted by similar reference numerals.

Figure 8:
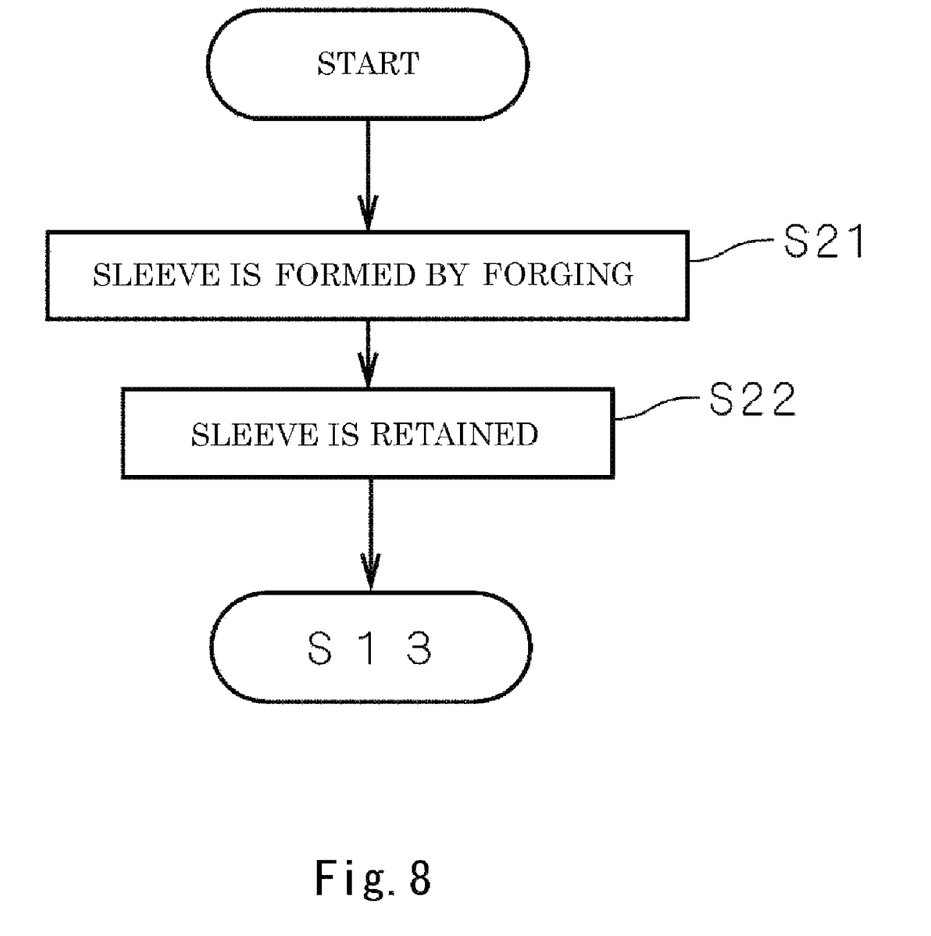
FIG. 8 is a flowchart showing a flow of steps required to manufacture the sleeve.
Figure 9:
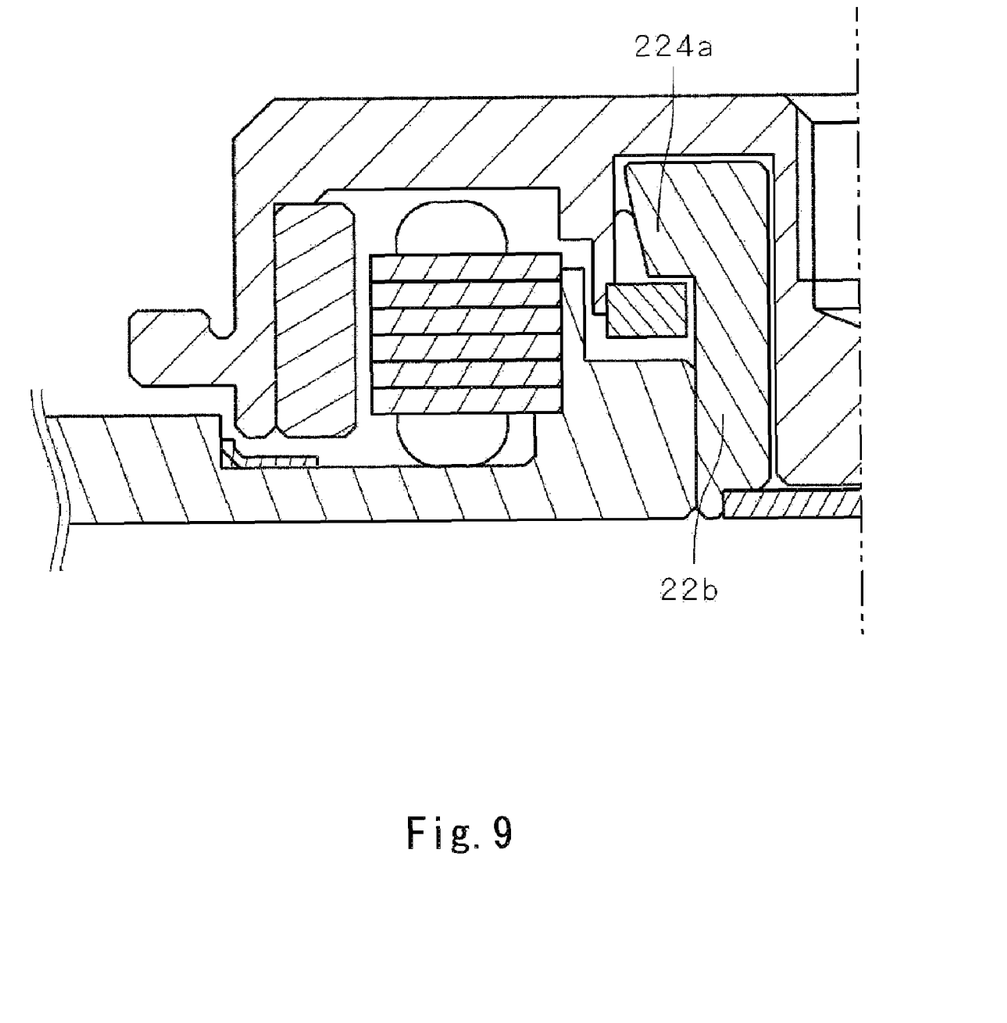
FIG. 9 is a diagram showing an example of another motor.

FIG. 8 is a flowchart showing a flow of steps required to manufacture the sleeve 22a. Note that steps following a step S22 shown in FIG. 8 are identical to steps S13 through S17 shown in FIG. 4. First, a preliminary shape of the sleeve 22a is forged out of a metallic work piece (step S21). Then the preliminary shape of the sleeve 22a is retained by the chuck 91 (see FIG. 5a) (step S22).

Then steps S13 through S17 as executed in the first preferred embodiment are executed on the collar portion 224a of the sleeve 22a. That is, the chamfering process on the circumferential edge of the top surface 2241, the first cutting process on the outer side surface of the outer side surface 2243, the cutting process on the bottom surface 2242, the chamfering process on the circumferential edge of the bottom surface 2242, and then the second cutting process on the outer side surface 2243 will be executed. By virtue of such manufacturing method, the preliminary shape of the sleeve 22a is forged effectively and the precise dimension of the sleeve 22a will be achieved in the similar manner as in the first preferred embodiment.

Note that a sleeve 22b can also be manufactured by executing the cutting process on the collar portion 224a after a preliminary shape of the sleeve 22b including the flange shaped collar portion 224a (see FIG. 9) as described in the second preferred embodiment is manufactured by forging as described in the third preferred embodiment.

While the present invention has been described in detail, the foregoing description is in all aspects illustrative and not restrictive. It is understood that numerous other modifications and variations can be devised without departing from the scope of the present invention.

For example, the press working executed on the work piece for forming the sleeve housing according to the first and the second preferred embodiments can be such that a force is applied to the housing cylindrical portion 223 from the bottom side thereof so as to remove the sleeve housing out of the work piece. When the sleeve housing is manufactured in such a manner, the burrs will be formed on the circumference surrounding the bottom surface 2242 of the collar portion 224, and therefore, the burrs will be moved during the chamfering process of step S16.

As for the cutting process executed on the collar portion according to the aforementioned preferred embodiments, steps S15 through S17 can be executed prior to steps S13 and S14. That is, the cutting process on the bottom surface 2242, the chamfering process on the circumferential edge of the bottom surface 2242, and the cutting process on the outer side surface 2243 executed from the side of the lower side edge 2245 will be executed prior to the execution of the chamfering process on the circumferential edge of the top surface 2241, and the cutting process on the outer side surface 2243 executed from the side of the upper side edge 2244. When the manufacturing method is executed in the aforementioned order, the second cutting process on the outer side surface 2243 executed from the side of the upper side edge 2244 in the downward direction will end at the portion between the upper side edge 2244 and the lower side edge 2245.

Further, according to the aforementioned preferred embodiments, the first cutting process on the outer side surface 2243 will be executed on an entire area expanding from the upper side edge 2244 of the outer side surface 2243 to the lower side edge 2245. That is, the first cutting process ends at the lower side edge 2245 of the outer side surface 2243. However, the first cutting process can end at the portion of the outer side surface 2243 between the upper side edge 2244 and the lower side edge 2245, in which case, an entire area of the outer side surface 2243 will be the subject to the cutting process.

Although the plurality of dynamic pressure grooves are preferably formed on the top surface of the collar portion according to the first and the second preferred embodiment of the present invention, the dynamic pressure grooves can be formed on the top surface of the sleeve so as to form the thrust dynamic pressure bearing portion between the bottom of the discoid portion of the rotor hub and the top surface of the sleeve. Even when such thrust dynamic pressure bearing portion as described above is formed, if the sleeve housing configuring the bearing member therein is formed in accordance with the manufacturing method as described above, the characteristics of the motor will be improved.

Note that the motor according to the aforementioned preferred embodiments of the present invention may be an inner rotor type motor in which the rotor magnet is arranged inside the stator. Further, as for the bearing unit, a gas dynamic pressure bearing which utilizes gas as a working medium may be used.

Further, note that although the shaft 311 of the rotor hub 31 and the disk portion 312 preferably are seamlessly formed and integral with one another to define a unitary member according to the aforementioned preferred embodiments, the present invention is not limited thereto. For example, the shaft 311 may be formed separately from the disk portion and then is attached to the disk portion, in which case, the shaft may be attached to the disk portion via a bushing or the like which is prefixed to the disk portion.

The recording disk drive device 60 which includes the motor as described above may be used as a device for driving a disk shaped recording medium (e.g., an optical disk, an optical magnetic disk, etc.).

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A manufacturing method of a sleeve housing accommodating a sleeve for rotatably supporting an axial member including a shaft, a discoid portion arranged at a top end of the shaft, an annular portion arranged axially below the discoid portion, and a collar portion arranged between the discoid portion and the annular portion, the method comprising the steps of:
   a) forming, by press working, the sleeve housing to have a preliminary shape including therein a substantially cylindrical portion and a collar portion extending in an outward direction;
   b) retaining via a retaining portion, which relatively rotates with respect to a cutting tool concentrically about a predetermined rotational axis, the sleeve housing in the form of the preliminary shape; and
   c) cutting on a lower portion of the collar portion while using a top portion of the collar portion as a datum plane for controlling an axial distance between the lower portion and the top portion of the collar portion.

2. The manufacturing method of the sleeve housing according to claim 1, further comprising the step of:
   d) after the step b), chamfering a circumferential portion of the top surface of the collar portion.

3. The manufacturing method of the sleeve housing according to claim 2, further comprising the step of:
   e) after the step b), cutting an outer circumferential portion of the top surface of the collar portion.

4. The manufacturing method of the sleeve housing according to claim 2, further comprising the steps of:
   c1) following the step c), cutting an outer side surface of the collar portion from a bottom edge of the outer side surface in an upward direction; and
   d1) following the step d), cutting the outer side surface of the collar portion from a top edge of the outer side surface in a downward direction, wherein,
   an end position of the cutting executed in either one of the steps c1) and d1) executed after the other step overlaps in an axial direction an end position of the cutting in either one of the steps c1) and d1) executed prior to the other.

5. The manufacturing method of the sleeve housing according to claim 2, wherein a target depth of cutting performed in the step c) is greater than about 10 μm and less than about 40 μm.

6. The manufacturing method of the sleeve housing according to claim 2, wherein at least one dynamic pressure groove arranged to generate dynamic pressure when a motor including therein the sleeve housing is in motion is formed at the top surface of the collar portion during the step a).

7. The manufacturing method of the sleeve housing according to claim 1, further comprising the step of:
   e) after the step b), cutting an outer circumferential portion of the top surface of the collar portion.

8. The manufacturing method of the sleeve housing according to claim 1, wherein a target depth of cutting performed in the step c) is greater than about 10 μm and less than about 40 μm.

9. The manufacturing method of the sleeve housing according to claim 1, wherein at least one dynamic pressure groove arranged to generate dynamic pressure when a motor including therein the sleeve housing is in motion is formed at the top surface of the collar portion during the step a).

10. The manufacturing method of the sleeve housing according to claim 1, wherein the retaining portion includes a plurality of chuck members each making contact with an inner surface of the cylindrical portion, being inserted from a side of the collar portion into the cylindrical portion, and moving in a radial direction, and each chuck member includes an insertion portion arranged to be inserted into the cylindrical portion and a latch portion extending from the insertion portion in the radial direction and arranged to make contact with the top surface of the collar portion.

11. A manufacturing method of a sleeve for rotatably supporting an axial member including a shaft, a discoid portion arranged at a top end of the shaft, an annular portion arranged axially below the discoid portion, and a collar portion arranged between the discoid portion and the annular portion, the method comprising the steps of:
- a) forming, by forging, the sleeve to have a preliminary shape including therein a substantially cylindrical portion and a collar portion extending in an outward direction;
- b) retaining via a retaining portion, which relatively rotates with respect to a cutting tool concentrically about a predetermined rotational axis; and
- c) cutting on a lower portion of the collar portion while using a top portion of the collar portion as a datum plane for controlling an axial distance between the lower portion and the top portion of the collar portion.

12. The manufacturing method of the sleeve according to claim 11, further comprising the step of:
- d) after the step b), chamfering a circumferential portion of the top surface of the collar portion.

13. The manufacturing method of the sleeve according to claim 12, further comprising the step of:
- e) after the step b), cutting an outer circumferential portion of the top surface of the collar portion.

14. The manufacturing method of the sleeve according to claim 12, further comprising the steps of:
- c1) following the step c), cutting an outer side surface of the collar portion from a bottom edge of the outer side surface in an upward direction; and
- d1) following the step d), cutting on the outer side surface of the collar portion from a top edge of the outer side surface in a downward direction, wherein
  an end position of the cutting executed in either one of the steps c1) and d1) executed after the other step overlaps in an axial direction an end position of the cutting in either one of the steps c1) and d1) executed prior to the other.

15. The manufacturing method of the sleeve according to claim 12, wherein a target depth of cutting performed in step c) is greater than about 10 μm and less than about 40 μm.

16. The manufacturing method of the sleeve according to claim 12, wherein at least one dynamic pressure groove arranged to generate dynamic pressure when a motor including therein the sleeve is in motion is formed at the top surface of the collar portion during the step a).

17. The manufacturing method of the sleeve according to claim 11, further comprising the step of:
- e) after the step b), cutting an outer circumferential portion of the top surface of the collar portion.

18. The manufacturing method of the sleeve according to claim 11, wherein a target depth of cutting performed in the step c) is greater than about 10 μm and less than about 40 μm.

19. The manufacturing method of the sleeve according to claim 11, wherein at least one dynamic pressure groove arranged to generate dynamic pressure when a motor including therein the sleeve is in motion is formed at the top surface of the collar portion during the step a).

20. The manufacturing method of the sleeve according to claim 11, wherein
  the retaining portion includes a plurality of chuck members each making contact with an inner surface of the cylindrical portion, being inserted from a side of the collar portion into the cylindrical portion, and moving in a radial direction, and
  each chuck member includes an insertion portion arranged to be inserted into the cylindrical portion in the radial direction and making contact with the top surface of the collar portion.

* * * * *